Feb. 23, 1932. K. STRICHOW 1,846,281
APPARATUS WITH A ROTATABLE TILTING DRUM FOR DRAWING OFF LIQUIDS
Filed Aug. 20, 1928
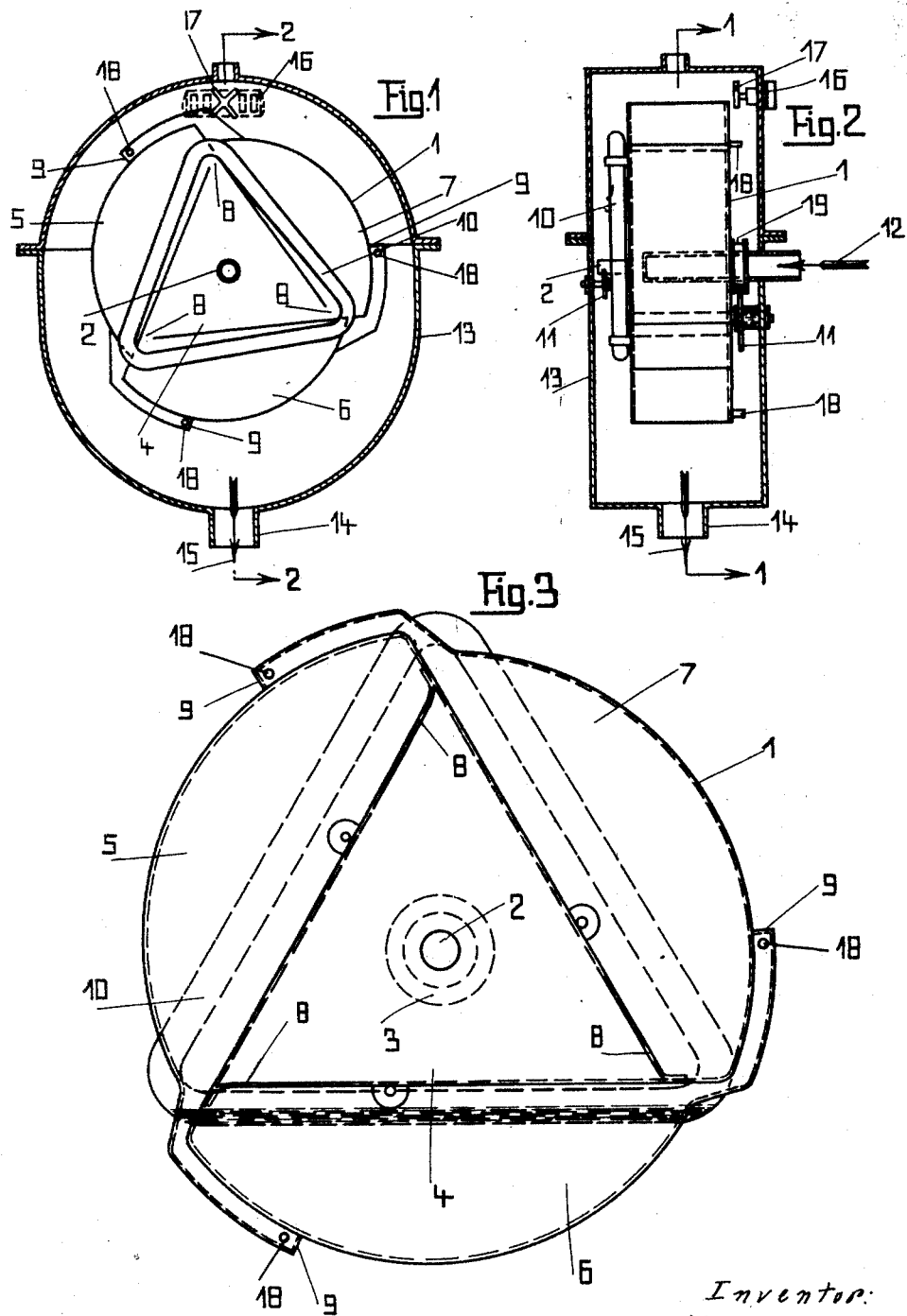

Patented Feb. 23, 1932

1,846,281

UNITED STATES PATENT OFFICE

KARL STRICHOW, OF VETSCHAU, GERMANY

APPARATUS WITH A ROTATABLE TILTING DRUM FOR DRAWING OFF LIQUIDS

Application filed August 20, 1928, Serial No. 300,923, and in Germany August 18, 1927.

This invention relates to a dispensing device for liquids incorporating a rotating measuring drum, which consists of one chamber in the middle, surrounded by a plurality of measuring chambers.

These chambers effect during their filling, a rotation of the drum in such a way, that the emptying of the chambers takes place. Furthermore, this rotation actuates a counting and recording device.

The object of the present invention is a supplementary device, by which a high degree of accuracy in measuring is obtained by causing prompter rotation and complete discharge of the measuring chambers of the drum.

My invention consists in a tubular member of polygonal cross section, each corner of which corresponds to the aperture of one measuring chamber. This polygon is attached to the drum in any suitable manner and filled with granular or liquid loading means. During the slow rotation of the drum the rush of these loading means accelerates the tilting of the drum, and brings it suddenly into its discharging position after filling the corresponding measuring chamber. Thus a quick and complete discharge of the chamber is obtained.

The invention has been shown by way of example in the accompanying drawings in which Fig. 1 represents a dispensing device in vertical longitudinal section according to line 1—1 of the Fig. 2 showing the measuring drum in front view, Fig. 2 a sectional view according to line 2—2 of Fig. 1 showing the measuring drum in side view, Fig. 3 representing the measuring drum on an enlarged scale.

In the drawings 1 represents the measuring drum, consisting of an intermediate, triangular supply chamber 4 and three segmental measuring chambers 5, 6 and 7 disposed round said supply chamber. The drum is rotatably supported upon supporting rollers 11 by means of a cylindrical attachment and of a journal 2. The supply pipe 3 is fixed and has been made to pass axially through the attachment 19 and the corresponding lateral wall of the measuring drum 1 and terminates in the supply chamber 4. The liquid to be measured, for instance gasoline, benzole or the like passes in the direction of the arrow 12 through the pipe 3 into the supply chamber 4 and reaches the measuring chamber 5, 6 or 7, whichever may be lowermost at the time, after leaving the supply chamber 4 through the apertures 8. Considering the position of the measuring drum in accordance with the example of performance as shown in the drawings this would in this instance be the measuring chamber 6. In consequence of the displacement of the centre of gravity as a result of this measuring chamber being filled, the drum is caused to turn, so that the corresponding measuring chamber, after being charged, is discharged, via the discharge aperture 9, into the casing 13 of the dispensing device, from which it may be dispensed through the pipe 14 in the direction of the arrow 15.

The number of revolutions of the drum, which is proportional to the quantity of the liquid dispensed, may be read off by means of the counting device 16 being actuated through the medium of a star wheel 17 with the aid of stops 18 attached to the measuring drum 1. In the example of performance each of the measuring chambers 5, 6, 7 has been provided with such a stop 18, so that the star wheel 17 is fed by one tooth in conjunction with each discharge of such measuring chamber.

The rotatable measuring drum 1 is made to support a polygon 10 consisting of a tube closed in itself, the number of corners of said polygon corresponding to the number of measuring chambers 5, 6, 7. The tubular polygon has been partly filled with a loading medium, e. g. mercury or any other suitable or grainy substance.

This tubular polygon, the essential object of my invention, works in the following manner:

Since the drum, by itself alone, rotates too slowly and the measuring process requires a comparatively long time, so that the opening and closing of the supply and outlet openings is not effected with sufficient exactness, the tubular polygon is attached to the drum, appropriately filled and loaded. If the drum starts to move with a slow rotation, the filling means in the tubular polygon, after reaching the horizontal position of the lowermost side of the polygon, overflows with a sudden rush into the next corner thereof, and thus accelerates the tilting of the drum into the next position, that is to say, into the discharging position of the next measuring chamber.

The quantity of the filling means may be such that in the lowest position of one corner of the polygon the two adjacent sides are filled to about half their volume.

What I claim is:

1. Improvements in a rotatable measuring drum for liquid dispensing devices with a plurality of measuring chambers, consisting of a tubular polygon attached to said rotatable measuring drum, each corner of which polygon corresponding in position to the discharge aperture of a measuring chamber of said measuring drum and a loading medium in the tubular polygon, partially filling said polygon.

2. Improvements in a rotatable measuring drum for liquid dispensing devices with a plurality of measuring chambers, consisting of a tubular polygon attached to said rotatable measuring drum, each corner of which polygon corresponding in position to the discharge aperture of a measuring chamber of said measuring drum and mercury as loading medium in the tubular polygon, partially filling said polygon.

In testimony whereof I have hereunto affixed my signature.

KARL STRICHOW.